J. NOVOTNY.
TAKE-UP MECHANISM.
APPLICATION FILED FEB. 23, 1917.

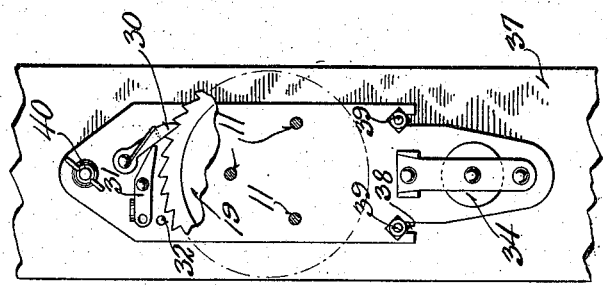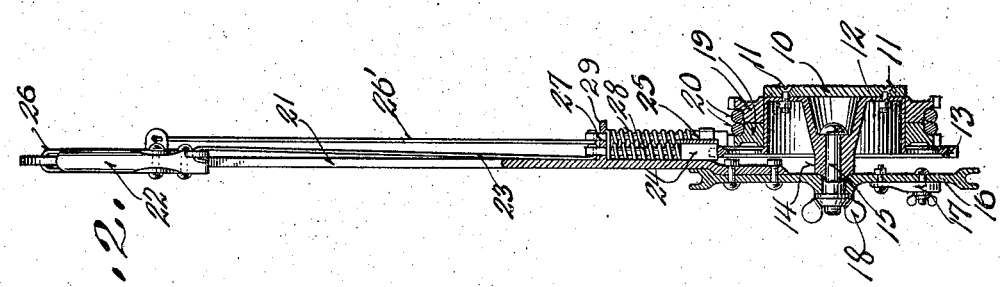

1,242,229.

Patented Oct. 9, 1917.
2 SHEETS—SHEET 2.

UNITED STATES PATENT OFFICE.

JAMES NOVOTNY, OF UNION CENTER, WISCONSIN, ASSIGNOR OF ONE-HALF TO JOHN E. KOSACK, OF UNION CENTER, WISCONSIN.

TAKE-UP MECHANISM.

1,242,229.   Specification of Letters Patent.   Patented Oct. 9, 1917.

Application filed February 23, 1917. Serial No. 150,389.

*To all whom it may concern:*

Be it known that I, JAMES NOVOTNY, a citizen of the United States, and resident of Union Center, in the county of Juneau and State of Wisconsin, have invented certain new and useful Improvements in Take-Up Mechanisms; and I do hereby declare that the following is a full, clear, and exact description thereof.

My invention relates to new and useful improvements in take-up devices, more particularly of the type embodied in Patent No. 1,168,104 granted to me January 11th, 1916, and comprising a ratchet controlled take-up drum associated with a lever carrying brake cable drum, both carried on a vehicle and forming a combined brake applying and load binding mechanism.

It is one object of my invention to simplify the structure and improve the efficiency and convenience of operation of devices of this character.

A further and important object resides in the provision of a take-up mechanism of this character, which may be associated with a wagon, as shown in my said patent, or which may be detached from the wagon and used in other take-up functions such as fence stretching and hoisting without affecting the operative assembly of the various parts of the take-up mechanism.

A still further object of my invention resides in the provision of an arrangement whereby the brake tensioning portion of my device may be removed from the load binding, or continuous take-up portion to provide for its ready application to vehicles wherein the brake tensioning function alone is desired.

With the above and other objects and advantages in view, the invention resides more particularly in the novel combination, formation and arrangement of parts hereinafter described and pointed out in the appended claim.

In the drawings:

Figure 1 is an elevational view of my improved take-up device adapted for fence stretching or like operations apart from a wagon.

Fig. 2 is a vertical sectional view therethrough on the line 2—2 of Fig. 1.

Fig. 3 is an elevational view of the body plate of my take-up device, showing its association with a wagon standard.

Figure 4:
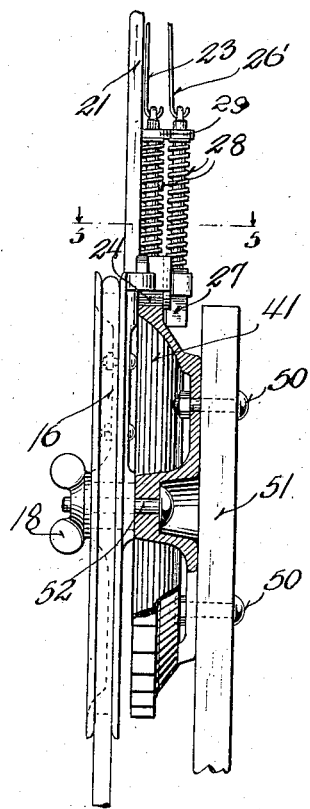
Fig. 4 is an edge elevational view of the brake tensioning portion of my device mounted to effect only its single function.

Referring now more particularly to the accompanying drawings, my improved take-up device comprises an elongated body plate 10 which may be either secured to a wagon, or which may be attached to an anchoring cable in the use of the device for stretching fences or in hoisting. Secured centrally to this body plate by bolts 11 passed through its end wall is a cup-shaped casting 12, the peripheral wall of which forms a journal for a take-up drum and said peripheral wall is provided at its free edge with an upstanding flange 13 having ratchet teeth formed on its periphery. Projecting from the central portion of the cup is a hub 14 in which is mounted a bolt 15 having journaled thereon a wheel 16 peripherally grooved to receive a brake tensioning cable, as shown in my previous patent, this wheel being provided with a preferably conventional clamp 17 for the cable. The wheel 16 is retained on the bolt preferably by a thumb screw 18 whereby it may be readily detached as desired. The take-up drum comprises a pair of drum sections 19 each including an outer peripheral flange portion carrying ratchet teeth, the drum sections being held against relative rotation in any desired manner and having wound thereon a take-up cable 20. Bolted to and extending radially from the wheel 18 is an operating handle 21 and this operating handle has pivoted to its free end a conventional grip member 22 to which is connected a link 23 extending to the shank of a pawl block 24 which is slidable in a block 25 projecting from the inner end of the lever and which is engageable with the teeth of the flange 13.

Thus the wheel 14 may be locked in any desired position to retain a desired tension of the brakes. For rotating the take-up drum 19 by means of this same handle, a second grip member 26 is pivoted to the outer end thereof and connected by a link 26' with a second pawl 27 slidable in the same block and engageable with the teeth of the adjacent section of the take-up drum 19. Both these pawls are resiliently urged to engaging relation by springs 28 bearing thereagainst and against an outwardly disposed guide ear 29 on the handle. The take-up drum 19 is held against retrograde movement by a spring urged pawl 30 pivoted to the body plate and engageable with the ratchet teeth of the inner drum section.

Thus, to rotate the take-up drum 19 for any desired purpose, the grip member 22 would be swung inwardly to lift its pawl 24, and successive rocking movements of the handle would rotate the drum through the medium of the pawl 27, it being understood that the brake controlling wheel 16 would oscillate freely in this movement. For procuring movement of the brake controlling wheel alone, both the grip members 22 and 26 would be swung inwardly. In such instances as, with a complete assembly of the device, it would not be desired to utilize the take-up drum 19, the pawl 30 for preventing retrograde movement of said drum may be locked in retracted position by means of an intermediately pivoted lever 31 having one end engageable therewith and having its other end apertured for the reception of a bolt or other locking means passed therethrough and through a corresponding aperture 32 in the body plate 10.

Taking up now the specific use of my device, Fig. 1 shows its application for fence stretching, in hoisting and in like operations and in this application of the device, the body plate 10 is disposed horizontally and has attached to one end thereof an anchor chain 33. Mounted on the other end is a pulley 34 about which an extension of the take-up cable 20 is trained, the cable being also trained about a second pulley attached to the work, and terminating in a hook 35 engageable with a bolt 36 on said end of the body plate. It will however be appreciated that the take-up cable may be extended directly from the work to the drum 19.

Referring now more particularly to Fig. 3, for attaching my device to a standard 37 of a wagon, the pulley carrying end of the body plate is reduced to form consequent shoulders provided with recesses 38, and these recesses are engageable with spaced bolts 39 extending from the standard to secure the lower portion of the body plate thereto. The upper portion of the body plate is secured to the standard by a bolt 40 passed through an opening therein, which opening is preferably utilized also for attachment of the anchor chain 33 in the first described application of my device.

With certain types of wagons which would not utilize a load binder, it may be desirable to associate the brake controlling portion of my device alone.

Figure 5:
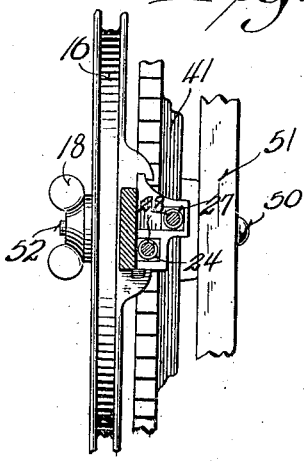
Fig. 5 is a transverse sectional view through the structure of Fig. 4 on the line 5—5 thereof.

Referring now more particularly to Figs. 4 and 5, in such instances I provide a ratchet wheel 41 which is secured by the bolts 50 to any suitable wagon portion 51 and the hub of this ratchet wheel carries a bolt 52 similar to the bolt 15 heretofore described, and on which the brake controlling wheel 16 may be mounted upon its disassembly from a combined take-up device as heretofore described. In this use, the pawl 27 of the handle 21 would be entirely idle, the pawl 24 of the handle engaging the teeth of the ratchet wheel in its usual manner.

By this novel arrangement, a single handle and pawl mechanism may be interchangeably used on a plurality of vehicles not necessarily embodying a load binding arrangement. It is noted that the flange 13 of the drum carrying casting is disposed outwardly of the flange of the drum, and to permit passage of the drum engaging pawl 27 past this flange in detaching the handle and pawl mechanism, a remote portion of the tooth flange is cut away at 13$^a$, as shown in Fig. 1, this cut away portion being disposed in such relative position to the handle that the pawl 24 does not normally move there adjacent.

What is claimed is:

A device of the class described comprising a body member, a cup-shaped casting, bolts passed through the end wall of the casting and the body member, an out turned toothed flange on the free edge of the peripheral wall of said casting, a toothed take-up drum rotatably mounted on said peripheral wall of the casting, a shaft carried by the central portion of the end wall of the casting, a brake controlling wheel mounted on said shaft, a handle extending radially from the wheel, pawls carried by the handle and engageable respectively with the toothed flange and with the drum and means for preventing retrograde movement of the drum.

In testimony that I claim the foregoing I have hereunto set my hand at Union Center, in the county of Juneau and State of Wisconsin, in the presence of two witnesses.

JAMES NOVOTNY.

Witnesses:
JOHN E. KOSACK,
M. E. BLAKEMAN.

Copies of this patent may be obtained for five cents each, by addressing the "Commissioner of Patents, Washington, D. C."